(12) United States Patent
Kinoshita et al.

(10) Patent No.: US 9,927,541 B2
(45) Date of Patent: Mar. 27, 2018

(54) APPARATUS FOR MONOPOLE AND MULTIPOLE SONIC LOGGING OF A DOWNHOLE FORMATION

(71) Applicant: Schlumberger Technology Corporation, Sugar land, TX (US)

(72) Inventors: Toshihiro Kinoshita, Sagamihara (JP); Naoki Sakiyama, Sagamihara (JP); Hitoshi Sugiyama, Sagamihara (JP); Yuichiro Wada, Kiyose (JP); Toshimichi Wago, Setagaya-Ku (JP); Akito Shigekane, Fukuroi (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 298 days.

(21) Appl. No.: 14/253,790

(22) Filed: Apr. 15, 2014

(65) Prior Publication Data
US 2015/0293251 A1 Oct. 15, 2015

(51) Int. Cl.
 *G01V 1/00* (2006.01)
 *G01V 1/44* (2006.01)

(52) U.S. Cl.
 CPC ..................... *G01V 1/44* (2013.01)

(58) Field of Classification Search
 USPC .................................................. 367/25, 911
 See application file for complete search history.

(56) References Cited

U.S. PATENT DOCUMENTS

| | | | |
|---|---|---|---|
| 4,872,526 A * | 10/1989 | Wignall | G01V 1/523 181/102 |
| 6,474,439 B1 | 11/2002 | Hoyle et al. | |
| 6,494,288 B1 | 12/2002 | Tashiro et al. | |
| 6,739,423 B2 | 5/2004 | Tashiro et al. | |
| 7,334,661 B2 | 2/2008 | Pabon et al. | |
| 7,336,562 B1 | 2/2008 | Hoyle et al. | |
| 7,364,007 B2 * | 4/2008 | Garcia-Osuna | E21B 47/01 166/250.16 |
| 8,286,475 B2 | 10/2012 | Nakajima et al. | |
| 2005/0150713 A1 * | 7/2005 | Garcia-Osuna | E21B 47/01 181/108 |
| 2005/0167101 A1 * | 8/2005 | Sugiyama | G01V 1/523 166/249 |
| 2008/0041575 A1 * | 2/2008 | Clark | E21B 17/003 166/65.1 |

\* cited by examiner

*Primary Examiner* — Isam A Alsomiri
*Assistant Examiner* — Jonathan D Armstrong
(74) *Attorney, Agent, or Firm* — Trevor G. Grove

(57) ABSTRACT

A tool for monopole and multipole sonic logging includes an acoustic source section, an acoustic receiver section, and an isolator section disposed therebetween. The tool may include a mandrel having integrally formed alternating first portions having a first outer diameter and second portions having a second outer diameter. The second outer diameter is smaller than the first outer diameter, which allows the portions to function acoustically as a mass and spring system. The isolator section sufficiently mutes or delays extensional and flexural modes intrinsic to the logging tool itself. Thus, the effects of the tool presence on the measurements are minimized. In addition, a plurality of axially oriented grooves are defined in an outer surface of the acoustic receiver section, and each groove is configured for receiving an acoustic receiver module that includes a sensor, an amplifier, an A/D converter, and a digital multiplexer.

19 Claims, 3 Drawing Sheets

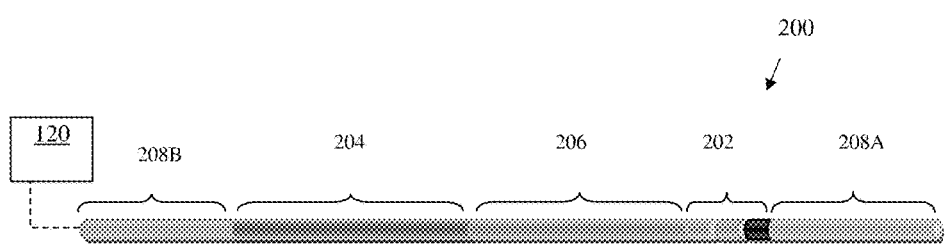
FIGURE 1
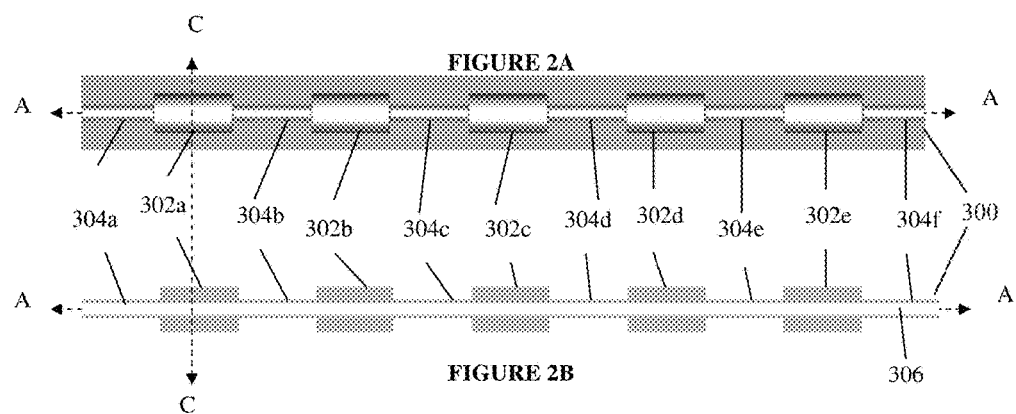
FIGURE 2A
FIGURE 2B
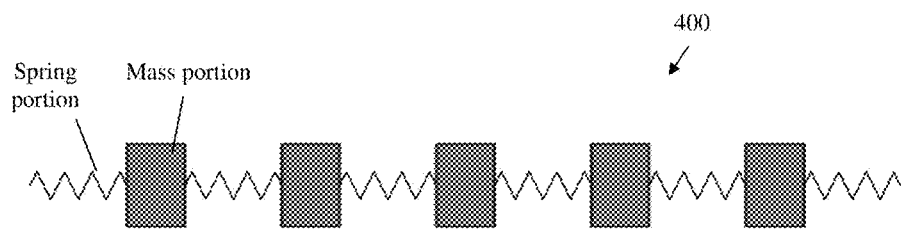
FIGURE 3

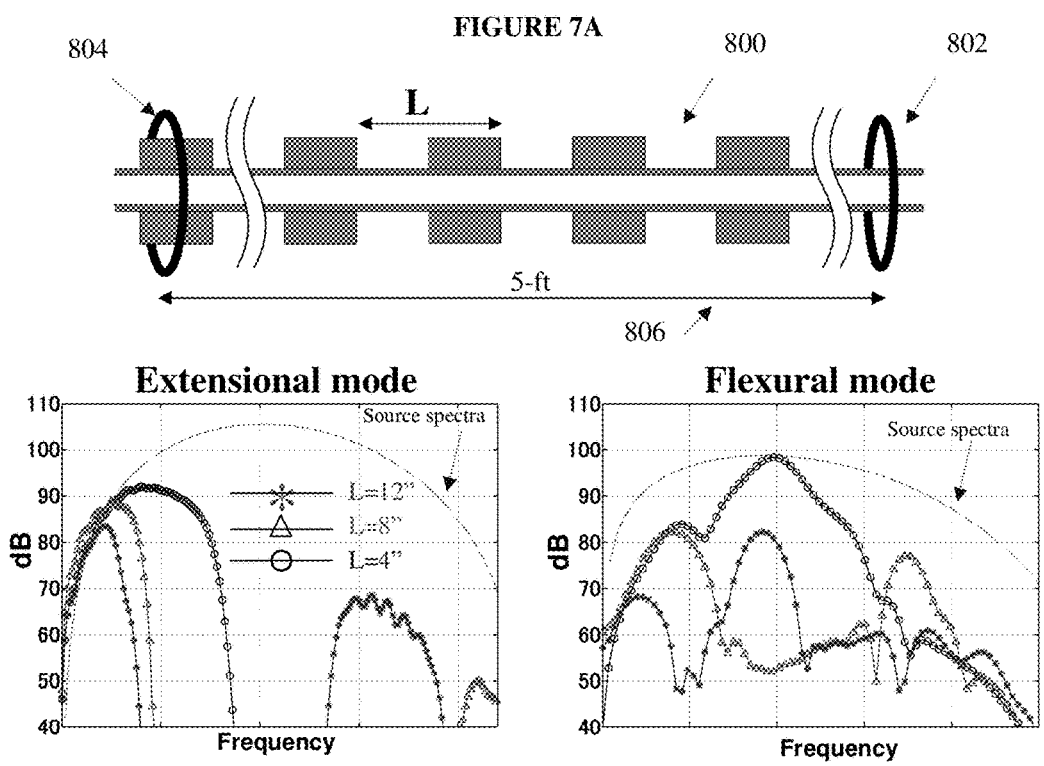
FIGURE 7A
FIGURE 7B
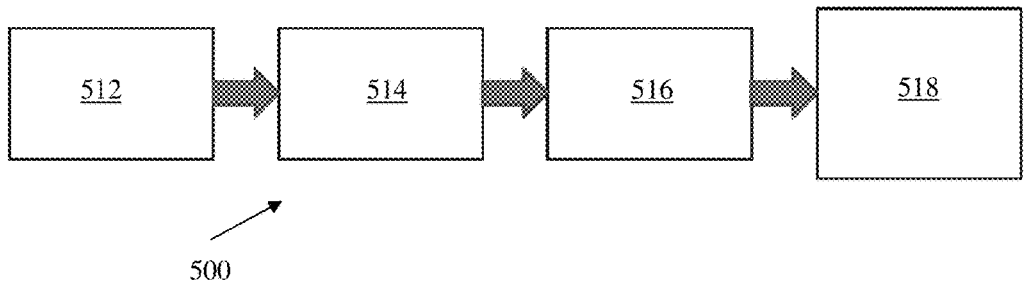
FIGURE 4

APPARATUS FOR MONOPOLE AND MULTIPOLE SONIC LOGGING OF A DOWNHOLE FORMATION

BACKGROUND

Dipole sonic logging in a fluid-filled borehole has been provided with DSI and Sonic Scanner, which are tools manufactured by the applicant. The tool diameter for these tools is 3⅝". For DSI, the acquisition electronics are located in an air section, which is away from the hydrophone sensors. In the case of Sonic Scanner, the amplifier and analog digital (A/D) converter are located closely to the sensors. To enable such a configuration, the structure in the receiver section and the electronics are contained in an outer sleeve, and non-conductive fluid is filled in the outer sleeve. This arrangement complicates the system because of the need for oil volume compensation under downhole conditions, and system maintenance is difficult.

SUMMARY

Various implementations of embodiment provide a tool for monopole and multipole sonic logging in a fluid-filled borehole, especially in a horizontal well or a high-angle well. According to certain implementations, at least one sensor, amplifier, analog to digital (A/D) converter, and multiplexer are encapsulated into an individual acoustic receiver modules that is attached adjacent to an outer diameter of the sonic logging tool. Having the receiver modules adjacent to the outer diameter of the tool allows for more accurate detection of pressure differences for the dipole measurement. In addition, the individual receiver modules provide high-quality measurements by digitizing the signals near the sensor. Thus, the sonic logging tool according to various implementations provides high-quality dipole sonic measurements with a smaller outer diameter logging tool. The small outer diameter may be critical for deployment of the tool in a horizontal well or a high-angle well.

In addition, according to certain implementations, extensional and flexural modes intrinsic to the logging tool itself are sufficiently muted or delayed due to the tool structure. Thus, the effects of the tool presence on the measurements are minimized. The structure enables high-quality monopole P&S (compression waves and shear waves) measurement, cross-dipole measurement, and Stoneley measurement without interference with the intrinsic modes of the structure.

A sonic logging tool may include an acoustic tool that includes an acoustic source section, an acoustic receiver section, and an isolator section arranged between the acoustic source section and the acoustic receiver section. The isolator section can be configured to function acoustically as a mass and spring system. For example, the isolator section can include a mandrel having alternating portions with different outer diameters.

The mandrel can be a continuous structure that extends axially between the acoustic source section and the acoustic receiver section. In addition, the mandrel can have a plurality of portions that have different outer diameters extending radially outwardly from a central axis of the mandrel. For example, first portions of the mandrel having a first outer diameter and second portions have a second outer diameter that is less than the first outer diameter. In addition, the first portions can be alternately arranged with the second portions along an axial direction of the mandrel. The mandrel may also be integrally formed. For example, the first and second portions and the mandrel may be machined from a cylinder, such as a solid cylinder.

Additionally, the mandrel can be configured to function acoustically as a mechanical band-stop filter. For example, a center frequency and/or a bandwidth of the mechanical band-stop filter can be related to respective sizes of the first and second portions of the mandrel. Alternatively or additionally, a center frequency and/or a bandwidth of the mechanical band-stop filter can be related to a periodicity of the first portions. The periodicity can be a distance between leading edges of two adjacent first portions or trailing edges of two adjacent first portions.

Alternatively or additionally, the acoustic source section can include a monopole acoustic source or a dipole acoustic source.

Alternatively or additionally, the acoustic receiver section can define a plurality of grooves that are each configured for receiving an acoustic receiver module. Each acoustic receiver module can include a transducer element that is configured for detecting acoustic signals, an electronic circuit configured to process the acoustic signals, and a fluid-filled container configured to house the transducer element and the electronic circuit. The electronic circuit can include an amplifier and an analog-to-digital converter. Additionally, the grooves may be defined on an outer surface of the acoustic receiver section. Optionally, the acoustic tool can further include a perforated sleeve arranged around the acoustic receiver section configured to protect the acoustic receiver modules.

Alternatively or additionally, the acoustic receiver section may also be defined on the mandrel. For example, one or more of the first portions of the mandrel may define grooves on an outer surface thereof, and each groove may be configured for receiving an acoustic receiver module therein.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 1 is a schematic diagram of an acoustic tool according to one implementation.

FIG. 2A is a side view of a mandrel having alternating portions with different outer diameters according to various implementations.

FIG. 2B is a cross-sectional view of the mandrel in FIG. 2A taken along the A-A line.

FIG. 3 is a block diagram of a mass and spring system.

FIG. 4 is a block diagram of a receiver module according to various implementations.

FIG. 7A is a schematic diagram of an acoustic tool according to one implementation.

FIG. 7B is a plot of the frequency in extensional and flexural modes of the acoustic tool shown in FIG. 7A for a periodicity between mass blocks of various lengths.

DETAILED DESCRIPTION

Figure 5:
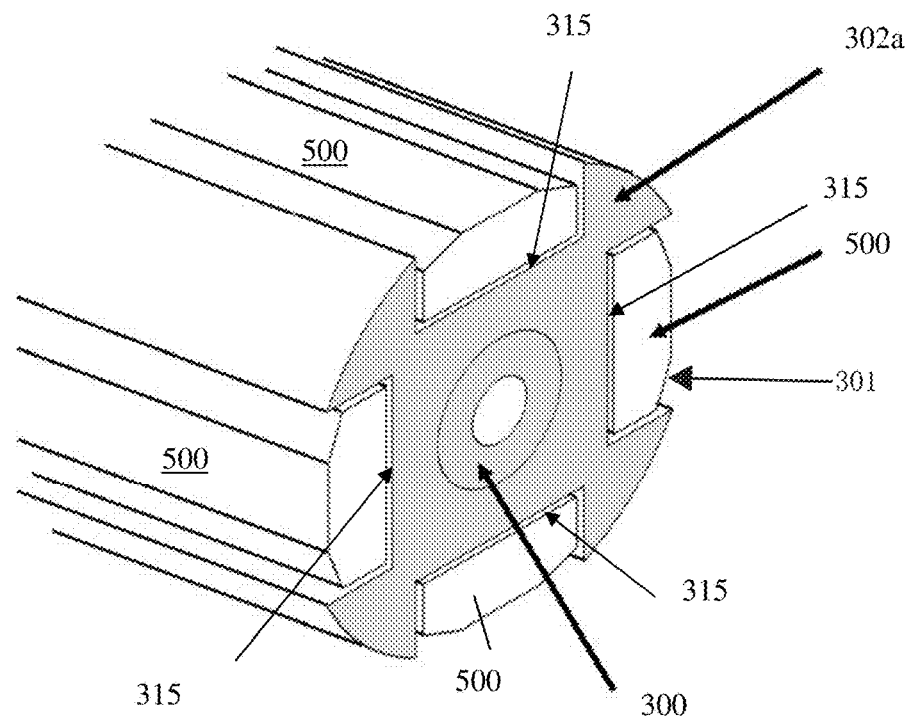
FIG. 5 is a perspective view of a portion of the mandrel shown in FIGS. 2A and 2B taken along the C-C line according to one implementation.

Unconventional reservoirs are becoming increasingly important sources of energy in the United States. The interest in shale gas and oil is also spreading in many other areas around the world such as Eastern Europe. Shale gas and oil production relies on two techniques to increase exposure to the hydrocarbon-bearing formation—horizontal drilling and hydraulic fracturing. These techniques make it more challenging for conventional wireline sonic logging tools to characterize such formations.

Compressional and two (e.g., fast and slow) shear slowness values from a cross-dipole sonic logging tool provide useful information to evaluate the presence of anisotropy. Thus, this information enables efficient and safe oil production. Stoneley waves are sensitive to open permeable fractures. Thus, fracture can be evaluated by analyzing reflections and transmission of Stoneley waves. Application of this technology ranges from well placement, wellbore stability, and completion optimization to production optimization.

Although it is well known that cross-dipole sonic and Stoneley logging provides useful value in hydrocarbon exploration and production, logging is carried out in a very limited number of horizontal wells or high-angle wells. There are conflicting requirements for a logging apparatus for such conditions.

First, the logging tool needs to be sufficiently strong mechanically so that the tool can be used in severe environment. The structure rigidity is also important for ensuring good centralization of the logging tool in a horizontal well. If the tool is eccentered in a borehole, dipole measurement is easily contaminated with Stoneley mode (borehole fluid mode). As a result, extracting accurate information from the borehole flexural mode becomes difficult.

Second, the logging tool should be sufficiently flexible so that the tool intrinsic flexural mode becomes slower than the borehole flexural mode. If the tool intrinsic mode is not sufficiently slow, the borehole flexural and the tool flexural modes interfere with each other, and the borehole flexural mode, which is to be measured, is altered.

Vertical and horizontal wellbores may be drilled into a formation that contains a desirable fluid, such as oil or gas, to extract the fluid. In addition, the vertical wellbore and the horizontal wellbore may be fluid-filled wellbores, e.g., filled with a drilling fluid. The vertical wellbore and/or the horizontal wellbore can optionally have a sonic logging tool deployed therein. The sonic logging tool can be a wire line logging tool, for example. Although wire line logging tools are provided as examples herein, it should be understood that the sonic logging tool can also be an acoustic logging tool of another type such as a logging while drilling ("LWD") tool or a measurement while drilling ("MWD") tool. A sonic logging tool can include one or more acoustic sources and one or more acoustic receivers arranged therein. A sonic logging tool is described in further detail below. Furthermore, a deviated wellbore can also be drilled in the formation, and a sonic logging tool can be deployed therein.

The sonic logging tool may include an acoustic tool, such as acoustic tool 200 shown in FIG. 1. The acoustic tool 200 includes an acoustic source section 202, an acoustic receiver section 204, an isolator section 206, and electronic cartridges 208A and 208B. The acoustic source section 202 shown in FIG. 1 includes two dipole portions and a monopole portion. However, in various other implementations, the acoustic source(s) may include portions configured to excite monopole, dipole, or quadrupole acoustic modes and are configured to transmit energy (e.g., acoustic waves) into the formation. The energy can be characterized by its frequency and wavelength. Optionally, the acoustic source (s) can transmit broadband energy at frequencies between about 0.5 and about 20 kHz, for example. The transmitted energy can excite compressional, shear, Stoneley, flexural and/or quadrupole waves in the formation. For example, in certain implementations, the acoustic source section 202 includes at least one dipole transmitter. Additionally, in an implementation in which two dipole transmitters are included in the acoustic source section 202, such as is shown in FIG. 1, the dipole transmitters can be configured to excite in the 90-degree rotated direction from each other. Alternatively or additionally, the acoustic source section 202 may include a monopole transmitter, for example, to conduct compressional and monopole shear (P&S) and Stoneley measurements.

In addition, the acoustic receiver section 204 includes acoustic receiver(s) configured to detect the compressional, shear, Stoneley, flexural, or quadrupole waves travelling in the drilling fluid, for example. It should be understood that the energy transmitted by the acoustic source(s) can be reflected and/or refracted from the fluid-formation interface.

To enable high-quality measurement with a smaller outer diameter tool, independent receiver modules may be used. FIG. 4 illustrates a schematic diagram of an acoustic receiver module 500 according to one implementation. The acoustic receiver module 500 includes at least one sensor 512, amplifier 514, A/D converter 516, and digital multiplexer 518 that are encapsulated into the module 500. The sensor 512 may include a hydrophone or accelerometer to detect a wave, for example, according to certain implementations. The amplifier 514 amplifies and filters the signal received by the sensor 512. The A/D converter 516 digitizes the amplified and filtered signal. And, the digital multiplexer 518 allows data communication to the electronics cartridge inside the tool 200 to be realized with less number of cables and without signal degradation. These modules 500 may be attached to the acoustic receiver section 204 of the acoustic tool 200. In this way, waveform data obtained with the sensor(s) 512 are digitized near the sensor(s) 512 without having to send analog signals over long cables to the electronics cartridge.

The acoustic receiver module, such as acoustic receiver module 500, has a fluid container 301 as the outermost component. A fluid container 301 seals a fluid (not shown) inside the module. Having fluid in the module provides fluid volume compensation so that pressure inside and outside the module can balance under the downhole environment. Since the fluid in the container directly contacts the electronics inside, the fluid is electrically non-conductive. A type of non-conductive fluid that may be used is silicone oil.

In addition, the tool 200 may include a plurality of acoustic receiver modules arranged in an acoustic array. By arranging the acoustic receivers in an array spaced apart from the acoustic source(s), it is possible to improve signal quality and extract various borehole signals over a broad frequency band. For example, this arrangement enables dispersive processing of borehole modes considering differences in propagation speed in rocks depending on the frequency. The array of acoustic receivers may be configured to detect dipole signals in at least two orthogonal directions in a fluid-filled borehole, for example when the acoustic source section 202 includes acoustic source(s) having a dipole transmitter. The acoustic receivers may also be configured to detect monopole signals as well, for example, when the acoustic source section 202 includes acoustic source(s) having a monopole transmitter.

Furthermore, the acoustic tool 200 may be operably connected with a control unit 120. It should be understood that the control unit 120 can optionally be located above, on, and/or below the surface of the formation. Alternatively or additionally, the control unit 120 can be integrated with the acoustic tool 200 and arranged in the vertical wellbore and/or the horizontal wellbore. The control unit 120 can optionally be configured to control the acoustic source(s) and/or the acoustic receivers, as well as receive, process, and store acoustic data (e.g., the acoustic data detected, collect, recorded, etc. by the acoustic receivers). In its most basic configuration, the control unit 120 typically includes at least one processing unit and system memory. Depending on the exact configuration and type of control unit 120, system memory may be volatile (such as random access memory (RAM)), non-volatile (such as read-only memory (ROM), flash memory, etc.), or some combination of the two. The processing unit can be a standard programmable processor that performs arithmetic and logic operations for operation of the control unit 120.

For example, the processing unit can be configured to execute program code encoded in tangible, computer-readable media. Computer-readable media refers to any media that is capable of providing data that causes the control unit 120 (i.e., a machine) to operate in a particular fashion. Various computer-readable media may be utilized to provide instructions to the processing unit for execution. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In addition, the control unit 120 can have additional features/functionality. For example, the control unit 120 may include additional storage such as removable storage and non-removable storage including, but not limited to, magnetic or optical disks or tapes. The control unit 120 may also contain network connection(s) that allow the device to communicate with other devices. The control unit 120 may also have input device(s) such as a keyboard, mouse, touch screen, etc. Output device(s) such as a display, speakers, printer, etc. may also be included. The additional devices may be connected to the bus in order to facilitate communication of data among the components of the control unit 120. All these devices are well known in the art and need not be discussed at length here.

The electronic cartridges 208A and 208B can include the circuitry and/or power sources for controlling the acoustic source(s) in the acoustic source section 202 and the acoustic receiver(s) in the acoustic receiver section 204, respectively. The electronic cartridges 208A and 208B can also include the circuitry for data acquisition, data storing, signal processing, and communication with other logging tools.

The isolator section 206 is arranged between the acoustic source section 202 and the acoustic receiver section 204. The length of the isolator section 206 (e.g., the distance between the acoustic transmitters and receivers) is selected based on the borehole mode that is to be measured. Selecting an appropriate length based on the dimensions of the isolator section 206 allows the propagation along the tool structure to be muted in a certain frequency band. Thus, the structure may be designed such that formation signals can be dominant in the frequency band in which propagation is muted. This enables extracting the formation information with little contamination of the propagation along the tool. For example, the distance between the acoustic transmitters and receivers may be between about 5 feet and about 10 feet so that borehole modes are well established but are not decayed.

The isolator section 206 is configured to attenuate and/or delay the propagation along the acoustic tool 200 from the acoustic transmitters 202 to the acoustic receivers 204. For example, in the implementation shown in FIGS. 2A and 2B, the isolator section 206 includes a mandrel 300 having alternating portions with different outer diameters extending radially outwardly from a central axis A-A of the mandrel 300. As shown in FIGS. 2A and 2B, the mandrel 300 can have a plurality of first portions 302a-e having a first outer diameter and a plurality of second portions 304a-f having a second outer diameter, wherein the first outer diameter is greater than the second outer diameter. Additionally, the first portions 302a-e can be alternately arranged with the second portions 304a-f along an axial direction of the mandrel 300.

The mandrel 300 can also define a hollow conduit 306 along or about its central axis that has an inner diameter that is less than the outer diameters of the first 302a-e and second portions 304a-f. As compared to a mandrel with a simple hollow conduit in which the mandrel's intrinsic extensional mode is faster than compressional velocity of most formations and the mandrel's intrinsic flexural mode is faster than borehole flexural mode for most formations, the propagation speed of the extensional and flexural modes in the mandrel 300 become much slower due to the structure described in relation to FIGS. 2A and 2B.

The first 302a-e and second alternating portions 304a-f allow the mandrel 300 to function acoustically as a mechanical band-stop filter. For example, a center frequency and/or a bandwidth of the mechanical band-stop filter can be related to respective sizes of the first and second outer diameters. Alternatively or additionally, a center frequency and/or a bandwidth of the mechanical band-stop filter can be related to or a periodicity, L, of the first portions 302. As used herein, the periodicity, L, can be a distance between leading edges of adjacent first portions 302a-e, a distance between trailing edges of adjacent first portions 302a-e, or a distance between mid portions of adjacent first portions 302a-e.

The mandrel 300 can be an integrally formed, continuous structure that extends axially between the acoustic source section (e.g., the acoustic source section 202 shown in FIG. 1) and the acoustic receiver section (e.g., the acoustic receiver section 204 shown in FIG. 1). Sufficient mechanical filter performance depends upon the coupling between mass blocks and the mandrel. For example, when mass blocks are fastened (e.g., screwed or fixed with adhesive) onto the mandrel, the mechanical filter may not perform adequately. Accordingly, in the example shown in FIGS. 2A and 2B, the first portions 302a-e (which serve as the mass blocks), the second portions 304a-e, and the hollow conduit 306 are machined from the same cylinder to ensure complete coupling between the first portions 302a-e and the mandrel 300.

To provide sufficient mechanical strength in harsh downhole environments, the mandrel 300 can be made of a hard material such as steel or titanium. It should be understood that the material from which the mandrel is made can be selected based on the desired mechanical strength and filter performance and should therefore not be limited to the example materials provided herein.

The mandrel 300 (and therefore the isolator section 206 shown in FIG. 1) can be configured to function acoustically as a mass and spring system. For example, the first portions 302a-e serve as mass sections, and the second portions 304a-e, which are flexible, serve as spring sections. A block diagram of an alternating mass and spring system 400 is shown in FIG. 4. As a result, the propagation speed along the mandrel 300 becomes much slower than a simple mandrel (e.g., a mandrel with a hollow core for both extensional and flexural modes.) As noted above, the diameter and length of the first portions 302a-e and/or the second portions 304a-f and the periodicity of the first portions 302a-e may be selected, along with the length of the isolator section, to mute the propagation of signals through the tool in a certain frequency band. Thus, the structure may be designed such that formation signals can be dominant in the frequency band in which propagation is muted, which enables extracting the formation information with little contamination of the propagation along the tool.

Additionally or alternatively, the mandrel 300 may extend axially between and include the acoustic receiver section and the acoustic source section. For example, as shown in FIGS. 2A and 2B, first portion 302a includes the acoustic receiver section, and second portion 304f includes the acoustic source section. For example, according to one implementation, FIG. 5 illustrates acoustic receiver sections that include four axially-oriented grooves 315 defined along the outer surface of first portion 302a of mandrel 300. The grooves 315 are spaced apart from each other by about 90 degrees relative to the central axis A-A of the mandrel 300. Each groove 315 is configured for receiving therein an acoustic receiver module, such as the acoustic receiver module 500 described above in relation to FIG. 4.

Figure 6:
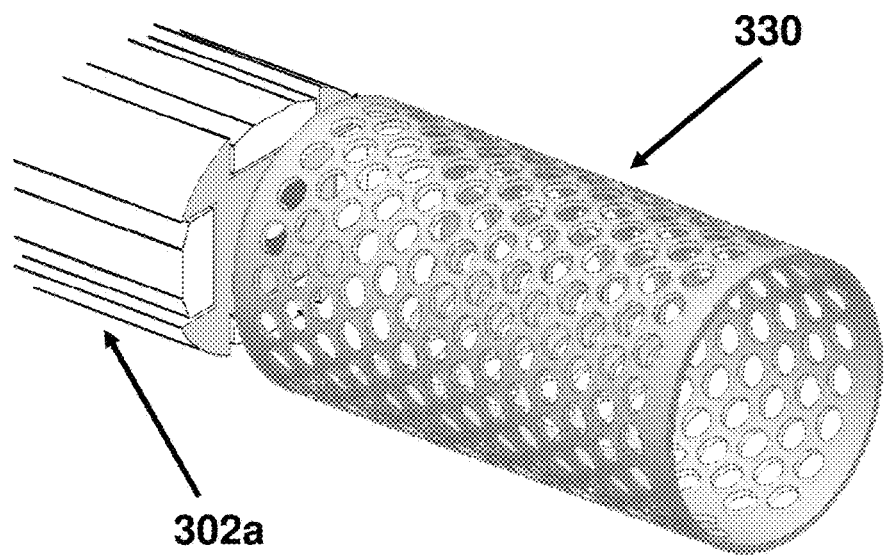
FIG. 6 is a perspective view of the mandrel in FIG. 5 and a perforated sleeve disposed over the mandrel, according to one implementation.

In a further implementation, as shown in FIG. 6, at least one metal perforated sleeve 330 is disposed around the mandrel 300 and is configured to protect the acoustic receiver modules disposed thereon. The sleeve 330 has sufficient mechanical strength to protect the acoustic receivers but is effectively acoustically transparent. In one implementation, the perforated sleeve 330 is made of steel having a thickness between about 1 and about 1.2 millimeters, but in other implementations, titanium or other suitable metallic material may be used.

In other implementations (not shown), the grooves may be defined within the mandrel, there may be more or less than two pairs of grooves, the grooves may be spaced apart from each other by an angle greater than or less than 90 degrees, and an acoustic receiver module may not be disposed in each groove. In addition, in other implementations (not shown), the perforated sleeve may be formed of plastic or another suitable material, and the thickness and other dimensions related to the sleeve may be adjusted to provide sufficient strength.

Disposing the acoustic receiver modules into the grooves 315 enables high signal-to-noise ratio measurements in four or more azimuthal directions on a smaller diameter tool. For example, when a hydrophone is used as a sensor for the acoustic receiver module, a directional signal such as a dipole signal is detected as differential pressure using two or more sensors. Therefore, at least four azimuthal sensors are used to detect two orthogonal dipole signals. The four azimuthal sensors may be evenly spaced apart about the circumference of the mandrel 300. Thus, disposing the acoustic receiver modules close to the outer diameter of the mandrel 300 allows the pressure difference for dipole measurement to be measured more accurately.

The perforated sleeve 330 provides environmental protection to the tool structure with minimum wall thickness. By making the sleeves thin and perforated, the sleeves are free from intrinsic mode, and acoustic propagation along the sleeves themselves will not affect the measurements. The smooth interface of the outer sleeves also prevents the first sections of the mandrel, such as sections 302a-e (or mass sections), from getting stuck.

FIG. 7A illustrates an acoustic tool 800 having a mandrel with a structure similar to the structure described above in relation to FIG. 5. In particular, the tool 800 includes an acoustic source section 802, an acoustic receiver section 804, and an isolator section 806 disposed between the acoustic source section 802 and the acoustic receiver section 804. The isolator section 806 is about 5 feet long, and the periodicity of the larger diameter mass sections 802 is L. FIG. 7B illustrates a propagation through the tool 800 of FIG. 7A at various periodicity lengths L of about 12 inches, about 8 inches, and about 4 inches. The waveforms are recorded by the acoustic receiver(s) in the acoustic receiver section 804. In one implementation, for example, the acoustic source(s) may include a source for inducing tool mode, and the acoustic receiver(s) may include a ring receiver for detecting tool mode.

The waveforms (not shown) and spectra look very different depending on the periodicity L of the structure. The structure works as a mechanical band-stop filter, and the band depends on the inner and the two different outer diameters of the structure and the periodicity in the axial direction. In other words, by tuning the dimension of the structure and the periodicity, the propagation along the tool structure can be muted in a certain frequency band. Thus, the structure may be designed such that formation signals can be dominant in the frequency band in which propagation is muted. This enables extracting the formation information with little contamination of the propagation along the tool.

The borehole diameters of horizontal wells or high-angle wells tend to be smaller than that of vertical wells. Even if the borehole diameter is not so small, bringing a logging tool to a horizontal well or a high-angle well may use special conveyance methods. In such a case, the logging tool is conveyed through a string of drill pipe, for example. To address such case, the tool diameter can be smaller than typical wireline logging tool diameters.

It should be understood that the vertical and horizontal wellbore described above are provided only as an example and are not intended to limit the orientation of wellbores that may be used with the tools described herein. Furthermore, it should be understood that the acoustic source(s) and acoustic receiver(s) described herein are provided only as examples and are not intended to be limiting.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. While implementations will be described for providing a sonic logging tool for measuring sonic data in a downhole environment, it will become evident to those skilled in the art that the implementations are not limited thereto.

What is claimed:

1. An acoustic tool, comprising:
    an acoustic source section;
    an acoustic receiver section; and
    an isolator section arranged between the acoustic source section and the acoustic receiver section, wherein the isolator section comprises a mandrel extended throughout an axial direction thereof, the mandrel having alternating portions that comprise alternate first and second portions with different outer diameters configured to function acoustically as a tuned mechanical band-stop filter, wherein the alternating portions are integrally formed with the mandrel from machining of a cylinder, and wherein distance between adjacent first portions determine, at least in part, a frequency band that mutes propagation along the acoustic tool for which formation signals are considered to be dominant,
    wherein the acoustic receiver section defines a plurality of grooves, each groove configured for receiving an acoustic receiver module therein, and wherein each acoustic receiver module comprises:
    a transducer element configured to detect acoustic signals;
    an electronic circuit configured to process the acoustic signals, the electronic circuit including an amplifier and an analog-to-digital converter; and
    a fluid container configured to house the transducer element and the electronic circuit.

2. The acoustic tool of claim 1, wherein the mandrel is a continuous structure that extends axially between the acoustic source section and the acoustic receiver section.

3. The acoustic tool of claim 1, wherein the mandrel defines a hollow conduit having an inner diameter that is less than the different outer diameters.

4. The acoustic tool of claim 1, wherein the mandrel has the first portions have a first outer diameter and the second portions have a second outer diameter, the first outer diameter being greater than the second outer diameter.

5. The acoustic tool of claim 1, wherein at least one of a center frequency and a bandwidth of the mechanical band-stop filter are related to respective outer diameters of the first and second portions or a periodicity of the first portions.

6. The acoustic tool of claim 5, wherein the periodicity is a distance between leading edges of adjacent first portions.

7. The acoustic tool of claim 1, wherein the acoustic source section comprises a monopole acoustic source or a dipole acoustic source.

8. The acoustic tool of claim 1, wherein the grooves are formed in an outer surface of the acoustic receiver section.

9. The acoustic tool of claim 8, wherein the grooves are axially oriented.

10. The acoustic tool of claim 9, further comprising a perforated sleeve arranged around the acoustic receiver section configured to protect the acoustic receiver modules.

11. The acoustic tool of claim 1, wherein the mandrel further comprises the acoustic receiver section.

12. The acoustic tool of claim 11, wherein the acoustic receiver section is defined on at least one of the first portions of the mandrel and defines a plurality of grooves in an outer diameter of the first portion, each groove configured for receiving an acoustic receiver module therein.

13. An acoustic tool, comprising:
    an acoustic source section;
    an acoustic receiver section; and
    an isolator section arranged between the acoustic source section and the acoustic receiver section, wherein the acoustic receiver and isolator sections comprise a mandrel extended throughout an axial direction thereof, the mandrel having alternating portions that comprise alternate first and second portions with different outer diameters configured to function acoustically as a tuned mechanical band-stop filter, wherein at least the isolator section of the mandrel is integrally formed from machining of a cylinder, and wherein distance between adjacent first portions determine, at least in part, a frequency band that mutes propagation along the acoustic tool for which formation signals are considered to be dominant,
    wherein the acoustic receiver section defines a plurality of grooves defined in one or more first portions,
    wherein the grooves are axially oriented, and
    wherein each groove is configured for receiving an acoustic receiver module, wherein each acoustic receiver module comprises:
    a transducer element configured to detect acoustic signals;
    an electronic circuit configured to process the acoustic signals, the electronic circuit including an amplifier and an analog-to-digital converter; and
    a fluid container configured to house the transducer element and the electronic circuit.

14. The acoustic tool of claim 13, wherein the mandrel is a continuous structure that extends axially between and includes the acoustic source section and the acoustic receiver section.

15. The acoustic tool of claim 14, wherein the mandrel defines a hollow conduit having an inner diameter that is less than the different outer diameters.

16. The acoustic tool of claim 13, wherein the first portions comprise a first outer diameter and the second portions comprise a second outer diameter, the first outer diameter being greater than the second outer diameter.

17. The acoustic tool of claim 13, wherein at least one of a center frequency and a bandwidth of the mechanical band-stop filter are related to respective diameters of the first portions and the second portions or a periodicity of the first portions.

18. The acoustic tool of claim 13, further comprising a perforated sleeve disposed around the acoustic receiver section configured to protect the acoustic receiver modules.

19. The acoustic tool of claim 13, wherein the acoustic source section comprises a monopole acoustic source or a dipole acoustic source.

* * * * *